United States Patent [19]
Boberski et al.

[11] 4,169,735
[45] Oct. 2, 1979

[54] CURABLE COMPOSITIONS COMPRISING AQUEOUS SOLUTIONS OF WATER-SOLUBLE SILICATES AND WATER-SOLUBLE BORATE LATENT INSOLUBILIZERS

[75] Inventors: William G. Boberski, Gibsonia; Jerome A. Seiner, Pittsburgh; John E. Blasko, Gibsonia, all of Pa.

[73] Assignee: PPG Industries, Inc., PA

[21] Appl. No.: 868,567

[22] Filed: Jan. 10, 1978

Related U.S. Application Data

[63] Continuation-in-part of Ser. No. 740,984, Nov. 11, 1976, abandoned.

[51] Int. Cl.$^2$ ................................................ C09D 1/02
[52] U.S. Cl. ...................................... 106/84; 106/38.3; 106/74; 106/287.1
[58] Field of Search .................... 106/14, 84, 38.3, 74, 106/287 S

[56] References Cited
U.S. PATENT DOCUMENTS 3,505,086  4/1970  Freyhold ........................... 106/287 S Primary Examiner—Winston A. Douglas
Assistant Examiner—J. V. Howard
Attorney, Agent, or Firm—Charles R. Wilson

[57] ABSTRACT

Curable one-package compositions which form products having excellent water resistance as well as other desirable properties are prepared by forming aqueous solutions of water-soluble silicates and water-soluble borate latent insolubilizers selected from the group consisting of alkali metal or quaternary ammonium borates, having dispersed therein certain inorganic pigments, preferably $TiO_2$. These curable compositions may be employed in a number of applications such as, for example, coatings, castings and moldings, but they are particularly useful in protective and decorative applications.

12 Claims, No Drawings

CURABLE COMPOSITIONS COMPRISING AQUEOUS SOLUTIONS OF WATER-SOLUBLE SILICATES AND WATER-SOLUBLE BORATE LATENT INSOLUBILIZERS

CROSS-REFERENCE TO RELATED APPLICATIONS

This application is a continuation-in-part of application Ser. No. 740,984, filed Nov. 11, 1976, now abandoned.

BACKGROUND OF THE INVENTION

During the past several years, environmental pollution concerns have led those active in the coatings, castings and moldings arts to develop various curable compositions in which organic solvents derived from petroleum have been eliminated or at least substantially minimized. Thus, compositions such as water-based compositions and high solids compositions have been extensively investigated. Even more recently the petroleum embargo and the resultant high cost and scarcity of petroleum by-products has engendered interest in the development of curable compositions which are composed entirely of, or at least substantially of, inorganic components.

The present invention relates to a curable composition composed essentially of inorganic constituents. More particularly, the present invention relates to curable compositions comprising aqueous solutions of water-soluble silicates and water-soluble borate latent insolubilizers, having dispersed therein an inorganic pigment, preferrably $TiO_2$.

A number of water-soluble silicate compounds are known in the art. Such compounds include sodium silicate, potassium silicate, lithium silicate and quaternary ammonium silicates which readily dissolve in water to form solutions therewith. Inasmuch as the pH of these solutions is normally higher than about 10.5, the silica will remain soluble therein. However, when these water-soluble silicates are blended with insolubilizing agents (i.e., crosslinkers) quite often the resultant solution is unstable. Thus, for example, the combination of water-soluble silicates with metal oxides of the form $M_xO_y$ such as cadmium oxide, copper oxide, calcium oxide, lead oxide and the like has produced unstable systems in that these materials ordinarily cause precipitation or gelation. In addition to problems of composition stability, compositions formed from water-soluble silicates and water-soluble insolubilizers have in the past proven to be extremely sensitive to water. Thus, such compositions have heretofore been deficient in web abrasion resistance.

Accordingly, a curable composition containing a water-soluble inorganic silicate and a water-soluble insolubilizer or crosslinker which produces products having excellent resistance to water as well as other desirable properties would be of considerable advantage.

SUMMARY OF THE INVENTION

The present invention relates to pigmented curable compositions formed from aqueous solutions of water-soluble silicates and water-soluble borate latent insolubilizers elected from the group consisting of alkali metal or quaternary ammonium borates.

Pigmented curable compositions based on aqueous solutions of these water-soluble silicates and water-soluble borate latent insolubilizers exhibit excellent resistance to water as well as having excellent durability and resistance to burning. Moreover, the curable compositions of the invention have the additional advantage that they can be cured by drying in air at ambient temperature or by the use of relatively low baking temperatures. The removal of water by air drying or baking causes the borate latent insolubilizer to become reactive and to crosslink the water-soluble silicate, thereby producng a solid product.

It is noted that the pigmented systems of the invention have properties superior to the corresponding unpigmented systems.

DESCRIPTION OF THE INVENTION

This invention is concerned with the discovery of curable compositions composed essentially or substantially of inorganic constituents. The curable compositions of the invention comprise aqueous solutions of water-soluble silicates and water-soluble borate latent insolubilizers, having dispersed therein an inorganic pigment, preferrably $TiO_2$.

Water-soluble silicates which may be employed in the compositions herein include sodium silicate, potassium silicate, lithium silicate, quaternary ammonium silicates and the like. A preferred water-soluble silicate is potassium silicate.

Water-soluble borate latent insolubilizers which are employed in the compositions of the invention are alkali metal or quaternary ammonium zincates, aluminates and borates.

Illustrative of such borate latent insolubilizers which can be employed are alkali metal and borate compounds such as, for example, lithium borate, potassium metaborate, sodium tetraborate and the like. The term "borate" as used in connection with the alkali metal borates is intended to include orthoborates, pyroborates, metaborates and more complex borate ions.

The amount of borate latent insolubilizers included in the compositions herein can vary considerably depending upon desired properties. However, in general, the amount of borate latent insolubilizer employed is an amount sufficient to enhance wet abrasion and water resistance of the cured composition but which is insufficient to cause package instability in the uncured composition. A stable package is defined as a package which when aged for 24 hours at 160° F. has not formed an irreversible gel and which still provides a wet abrasion resistant coating. Preferred compositions are stable at 160° F. for at least about two weeks. Wet abrasion resistance is evaluated by soaking a cured, coated glass panel, drawn with a 3 mil drawbar, in water (temperature 70° F.+5° F.) for one hour and then rubbing the surface of the cured coating with a water soaked cloth and determining the number of back and forth finger rubs (double finger rubs) needed to abrade the coating surface and expose the substrate. 50 double finger rubs are considered as the minimum acceptable abrasion resistance. Preferred coatings pass 100 double finger rubs, while the most preferred coatings pass 200 double finger rubs without complete abrasion. In most instances, amounts of borate latent insolubilizers ranging from 0.1 percent to 5.0 percent, preferably 0.25 percent to 2 percent by weight, based upon the combined weight of the water-soluble silicate and borate latent insolubilizer may be employed.

The reaction between the water-soluble silicate (i.e., alkali silicate) and borate latent insolubilizer is not known with certitude, however, it is theorized that while water is present the borate and the silicate do not interact. However, upon drying (e.g., air drying or baking) the equilibria shift and the borate then cross-links the silicate to form an insoluble silicate composition having excellent properties such as stain resistance, flame and heat resistance and water resistance.

In addition to the water-soluble silicate and metallate latent insolubilizer, the curable compositions of the invention contain an inorganic pigment selected from the group consisting of titanium dioxide; zirconium dioxide; alumina, preferrably hydrated alumina or tin oxide. The amount of this pigment should be an amount which provides at least about a 2.5% pigment volume concentration (PVC). The maximum of this pigment which can be employed is that amount which together with other "inert solid" i.e. solids other than the solids contributed by the soluble silicate-latent insolubilizer, is the "critical PVC" i.e. the concentration of material above which the amount of binder present is insufficient to provide a coherent, abrasion resistant film. Obviously this upper limit will vary with the precise materials employed, but is readily determinable by minimal experimentation. In most cases investigated this upper limit appears to be at a PVC of about 70 percent.

In the preferred embodiment the inorganic pigment is titanium dioxide, preferrably having a surface coating of $Al_2O_3/SiO_2$. Such coated titanium dioxide pigments are known in the art.

In addition to the above essential components the curable compositions of the invention may contain certain other additives usually employed in coating compositions including dyes, coloring pigments, inorganic fillers or extenders, flow control agents, surfactants and the like. As known in the art many of these coating additives may be partially or completely organic in nature, if desired.

Another unusual aspect of the compositions of the invention is the discovery that the addition of phosphate type surfactants to these compositions improves adhesion without impairing water resistance. Thus, for example, phosphate type surfactants or wetting agents such as potassium tripolyphosphate, sodium tripolyphosphate and organo phospates such as PK-90, available commercially from the Dexter Chemical Corporation, may be employed.

In addition it is often advantageous to include in the composition a thickener. Of particular value are water-soluble thickeners which are solubilized through carboxyl groups. Illustrative of such materials are sodium polyacrylate, potassium polymethacrylate, sodium salts of styrene maleic anhydride copolymers, sodium carboxymethyl cellulose, potassium polyacrylate copolymers and the like. Also suitable are inorganic thickeners such as clays and the like.

As mentioned above, the curable compositions of the invention can be employed in various applications such as for coatings, castings or moldings. The compositions are particularly useful in coatings over a variety of substrates such as wood, metals, glass, wallboard and the like.

The curable compositions herein, when used as coatings, can be applied by any conventional method, including brushing, dipping, rolling, flow coating, roll coating, spraying and the like. Conventional spray techniques and equipment can be utilized.

The curable compositions of the invention may be cured by baking at moderate or elevated temperatures if desired. However, one advantageous property of these curable compositions is that they can be cured by drying them in air at ambient temperature without the use of heat. As will be evident, ambient temperature curable compositions are of considerable advantage in that they provide for significant energy savings in comparison to compositions which require elevated temperatures for curing.

The following examples are submitted for the purpose of further illustrating the nature of the present invention and should not be construed as a limitation on the scope thereof. All parts and percentages in the examples and throughout the specification are by weight unless otherwise indicated.

In systems involving insolubilization of soluble silicates, variations in humidity during cure can lead to variability in results. Therefore in the following examples, comparisons of examples within each test grouping are valid while cross comparisons involving separate groupings cured under differing conditions (i.e. humidity) may not be valid.

The following examples illustrate the preparation of pigmented compositions of the invention.

EXAMPLE 1

A curable coating composition was prepared using conventional paint mixing techniques and equipment by admixing 231.3 grams of an aqueous potassium silicate solution having an $SiO_2:K_2O$ mole ratio of 3.3:1 and a solids content of 38.8 percent by weight, 5.03 grams of sodium tetraborate, 180 grams of water, 105.0 grams of titanium dioxide, 72.5 grams of mica and 10.0 grams of Attagel 40 (a magnesium aluminum silicate thixotropic agent available from Engehard Minerals Company).

The resultant composition was drawn down on duplicate sets of glass panels using a 3 mil Bird Bar. One set of coated glass panels was cured by air drying at ambient temperature for two days while the second set of coated panels was cured by air-drying at ambient temperature for six days.

The cured coatings were then evaluated for wet abrasion resistance by soaking the coated glass panels in water (temperature 70° F.±5° F.) for one hour and then rubbing the surface of the cured coating with a water soaked cloth. The wet abrasion resistance was evaluated by determining the number of back and forth finger rubs (recorded as double finger rubs) needed to abrade the coating surface and expose the substrate.

The coating cured by air-drying at ambient temperature for 2 days abraded after 2 double finger rubs while the same coating cured by air-drying at ambient temperature for 6 days did not abrade after 200 double finger rubs.

EXAMPLES 2-9

Coating compositions were prepared by formulating the following ingredients using ordinary coating formulation and pigment grinding techniques:

| Ingredients | Ex. No. | 2 | 3 | 4 | 5 | 6 | 7 | 8 | 9 |
|---|---|---|---|---|---|---|---|---|---|
| Aqueous potassium silicate solution[1] | | 350 | 350 | 350 | 350 | 350 | 350 | 350 | 350 |
| water | | 73 | 73 | 73 | 73 | 73 | 73 | 73 | 73 |
| sodium borate | | 5.0 | 2.5 | 3.75 | 1.25 | 6.75 | 0.62 | 2.5 | 2.5 |
| organic phosphate wetting agent[2] | | 0.6 | 0.6 | 0.6 | 0.6 | 0.6 | 0.6 | 0.6 | 0.6 |
| silicone antifoam agent (SWS 214) | | 1.5 | 1.5 | 1.5 | 1.5 | 1.5 | 1.5 | 1.5 | 1.5 |
| TiO$_2$ (CLNC grade) | | 105 | 105 | 105 | 105 | 105 | 105 | — | — |
| alumina | | — | — | — | — | — | — | 82 | — |
| silica | | — | — | — | — | — | — | — | 68 |
| mica | | 90 | 90 | 90 | 90 | 90 | 90 | 90 | 90 |
| magnesium aluminum silicate (Attagel 40) | | 10 | 10 | 10 | 10 | 10 | 10 | 10 | 10 |

[1] A solution having an SiO$_2$:K$_2$O mole ratio of 3.93:1 and a solids content of 29.1 percent by weight.
[2] PK-90 - an organic phosphate available from Dexter Chemical Company A series of coated glass panels were prepared by drawing down each of the above coatings on glass panels using a 3 mil Bird Bar. After curing at ambient temperature for five days, the cured coatings were evaluated for wet abrasion resistance as in Example 1.

| Example No. | No. of Double Finger Rubs |
|---|---|
| 2 | >200 |
| 3 | >200 |
| 4 | >200 |
| 5 | >200 |
| 6 | >200 |
| 7 | >200 |
| 8 | >200 |
| 9 | >200 |

After 3 days at 160° F. no hard gel was noted in 1/2 pint packages.

According to the provisions of the Patent Statues, there are described above the invention and what are now considered to be its best embodiments. However, within the scope of the appended claims, it is to be understood that the invention can be practiced otherwise than as specifically described.

What is claimed is:

1. A curable composition comprising an aqueous solution of a water-soluble silicate and a water-soluble latent insolubilizer selected from the group consisting of alkali metal borates and quaternary ammonium borates, having dispersed therein an inorganic pigment selected from the group consisting of titanium dioxide, zirconium dioxide, alumina and tin oxide in an amount which provides an at least about 2.5 percent pigment volume concentration, and wherein the amount of said insolubilizer included in the composition is sufficient to enhance the wet abrasion resistance of the cured coating, but insufficient to cause rapid package instability in the uncured state.

2. The curable composition of claim 1 wherein said latent insolubilizer is an alkali metal borate.

3. The curable composition of claim 1 further containing a thickener.

4. The curable composition of claim 3 wherein said thickener is a water-soluble thickener which has been rendered water-soluble by reaction of carboxyl groups contained in said thickener with base.

5. The curable composition of claim 1 further containing phosphate type surfactants and wetting agents.

6. The curable composition of claim 3 further containing phosphate type surfactants and wetting agents.

7. The curable composition of claim 1 wherein said water-soluble silicates are selected from the group consisting of lithium silicate, potassium silicate, sodium silicate and quaternary ammonium silicates.

8. The curable composition of claim 1 wherein the amount of said latent insolubilizer employed in said composition is from about 0.25 to about 2.0 percent by weight based upon the combined weight of the water-soluble silicate and latent insolubilizer.

9. The curable composition as in claim 8 where the inorganic pigment comprises titanium dioxide.

10. A method which comprises coating a substrate with the composition of claim 1 to provide a decorative or protective coating.

11. The curable composition of claim 7 wherein the pigment volume concentration is less than about 70 percent.

12. The curable composition of claim 11 wherein the amount of said latent insolubilizer employed in said composition is from about 0.1 percent to about 5.0 percent by weight based upon the combined weight of the water-soluble silicate and latent insolubilizer.

* * * * *